March 20, 1934.　　　A. STEINLE　　　1,951,849

PERISCOPE HEAD

Filed Oct. 19, 1932

Inventor:
Adolf Steinle

Patented Mar. 20, 1934

1,951,849

UNITED STATES PATENT OFFICE 1,951,849

PERISCOPE HEAD

Adolf Steinle, Jena, Germany, assignor to firm N. V. Nederlandsche Instrumenten Compagnie "Nedinsco", Venlo, Netherlands Application October 19, 1932, Serial No. 638,577
In Germany October 23, 1931

3 Claims. (Cl. 88—1)

I have filed applications in Germany, October 23, 1931, and in Italy, November 13, 1931.

The invention concerns a periscope head having a reflector for lateral vision, this reflector being fixed relatively to the periscope tube and positioned behind a lateral aperture which is provided in the said tube and closed by a plano-parallel glass plate.

In periscopes of this kind, the plano-parallel glass plate for lateral vision has been fixed to a flange at one side of the periscope head. The invention, which aims at avoiding this rather bulky construction and at providing a cylindrical periscope head of the smallest side dimensions possible that is easily manipulated and may be discerned only with difficulty when in use, connects the plano-parallel glass plate to a hollow glass cylinder which is disposed in the periscope tube and surrounds the reflector, the axis of this hollow cylinder being parallel to that of the periscope. The hollow cylinder and the glass plate are so disposed in the tube that the lower end surface of this cylinder rests against a seat in the tube and that the upper end surface, through the agency of an intermediate body, lies against a cover closing the tube above in such a manner that any ingress of water into the hollow cylinder is prevented.

When manufacturing the glass body, it is convenient to make the plano-parallel glass plate and to subsequently fuse it to the hollow cylinder.

Figure 1:
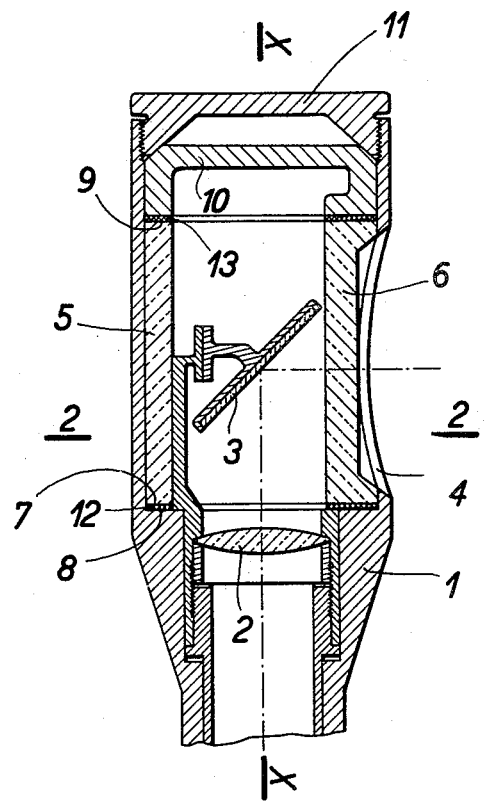
Figure 2:
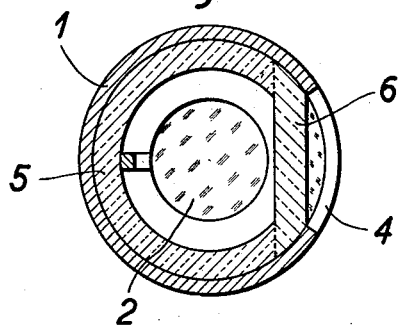

In the accompanying drawing, Figures 1 and 2 represent a periscope head according to the invention in a section through the vertical periscope axis and in a horizontal cross section on line 2—2 of Figure 1, respectively.

The tubular body 1, which carries the objective 2 and the reflector 3 and has in front of this reflector a lateral aperture 4, is assumed to be rotatable about the axis X—X so as to alter the viewing direction. In the body 1 is disposed a glass body comprising a hollow cylinder 5 fused to a plano-parallel glass plate 6 at that place which is near the lateral aperture 4, the fused parts being indicated in the drawing by dotted lines. The two end surfaces 7, 9 of the glass body 5, 6 rest against a seat 8 in the tubular body 1 and against a body 10, respectively. By screwing a cover 11 to the tubular body 1, the glass body 5, 6 is pressed against the seat 8, and the body 10 against the glass body 5, 6. Packing rings 12 and 13 protect the interior of the submerged periscope from any ingress of water.

I claim:

1. A periscope head, comprising a tube having a lateral aperture, and a glass body disposed in the tube behind said aperture, this glass body being an open cylindrically curved member with its axis parallel to the axis of the tube and having the opening closed by a plano-parallel glass plate which is adjacent the said aperture.

2. A periscope head, comprising a tube having a lateral aperture, and a glass body disposed in the tube behind said aperture, this glass body being an open cylindrically curved member with its axis parallel to the axis of the tube and having the opening closed by a plano-parallel glass plate, this plate being fused to the said member and lying adjacent the said aperture.

3. A periscope head, comprising a tube having a lateral aperture, a seat disposed in the tube below this aperture, a glass body disposed in the tube behind said aperture, this glass body being an open cylindrically curved member with its axis parallel to the axis of the tube and having the opening closed by a plano-parallel glass plate which is adjacent the said aperture, the lower end surface of the said glass body resting against the said seat, an intermediate member resting on the upper end surface of the said glass body, and a cover closing the tube above and acting on the said intermediate member.

ADOLF STEINLE.